Figure 3:
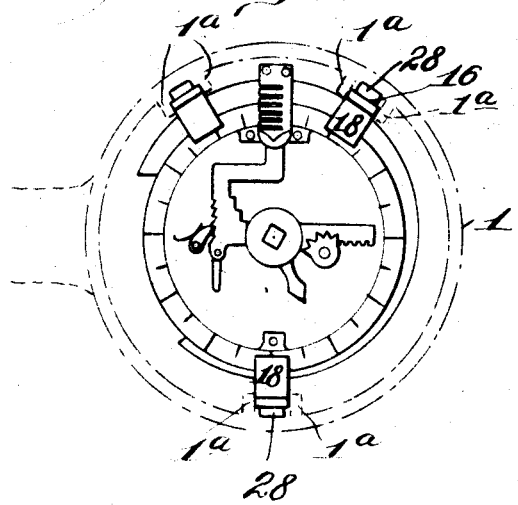

No. 868,570. PATENTED OCT. 15, 1907.
C. H. D'LA MONTE.
SPEED RECORDER.
APPLICATION FILED NOV. 22, 1906.
2 SHEETS—SHEET 1.
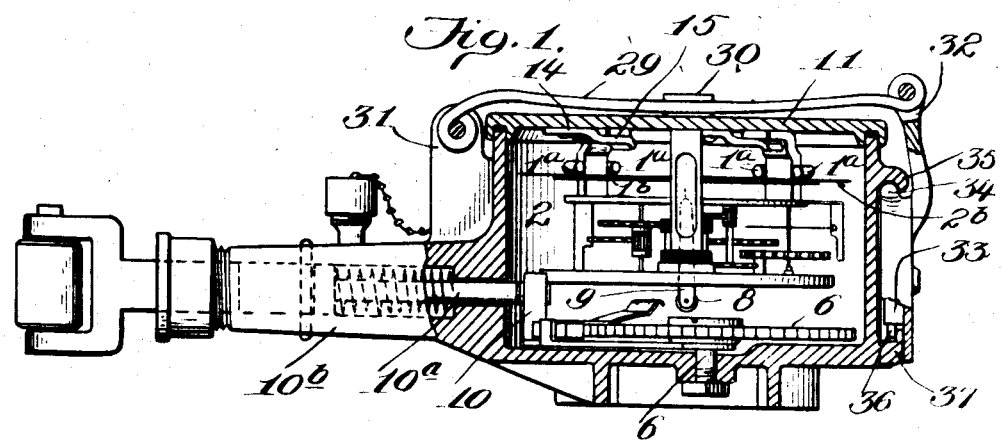
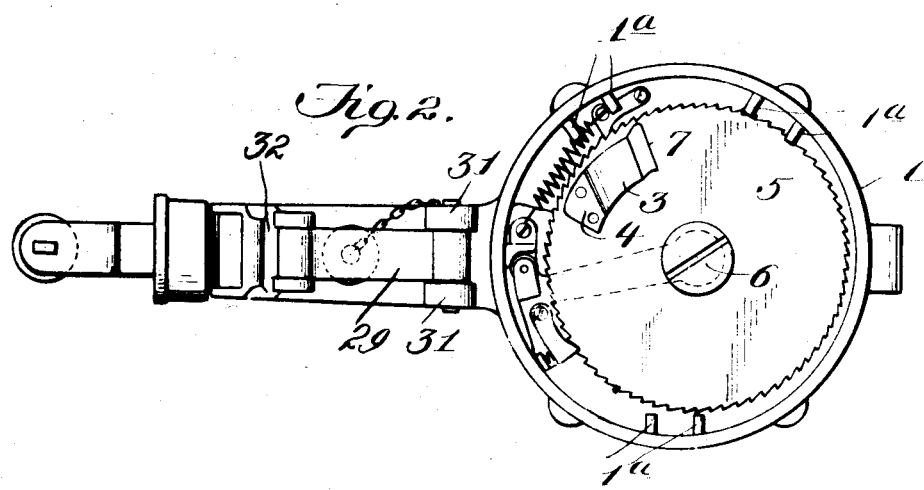
Witnesses:
Inventor
Cascious H. d'La Monte
By
James L. Norris
Atty.

No. 868,570. PATENTED OCT. 15, 1907.
C. H. D'LA MONTE.
SPEED RECORDER.
APPLICATION FILED NOV. 22, 1906.

2 SHEETS—SHEET 2.

Witnesses:
C. Kesler

Inventor
Cascious H. d'La Monte
By James L. Norris
Atty.

UNITED STATES PATENT OFFICE.

CASCIOUS H. D'LA MONTE, OF PHILADELPHIA, PENNSYLVANIA, ASSIGNOR, BY MESNE ASSIGNMENTS, TO INTERNATIONAL SPEED REGISTER CO., OF PHILADELPHIA, PENNSYLVANIA, A CORPORATION OF NEW YORK.

SPEED-RECORDER.

No. 868,570.     Specification of Letters Patent.     Patented Oct. 15, 1907.

Application filed November 22, 1906. Serial No. 344,628.

*To all whom it may concern:*

Be it known that I, CASCIOUS H. d'LA MONTE, a citizen of Mexico, residing at Philadelphia, in the county of Philadelphia and State of Pennsylvania, have invented new and useful Improvements in Speed-Recorders, of which the following is a specification.

This invention relates to speed recorders for use in connection with vehicles and of that character for recording distances, speed of travel, and the time consumed.

The object thereof is to provide an instrument of such class with a cushioned means for suspending the recording mechanism of the instrument so as to prevent the transmission to such mechanism of the vibrations of the vehicle or its axle during the travel of the vehicle so as to prevent any interference with the operation of such mechanism, and, consequently, obtaining thereby an accurate record, which would not be the case if the recording mechanism were open to jars or vibrations caused during the travel of the vehicle.

A further object of the invention is to provide a recorder with means to compensate for any inaccuracy as to height when positioning the recording mechanism, thereby rendering the operation of the punching mechanism always approximately the same.

With the foregoing and other objects in view, the invention consists of the novel construction, combination, and arrangement of parts hereinafter more specifically described and illustrated in the accompanying drawings, wherein is shown the preferred embodiment of the invention, but it is to be understood that changes, variations, and modifications can be resorted to which come within the scope of the claims hereunto appended.

Figure 4:
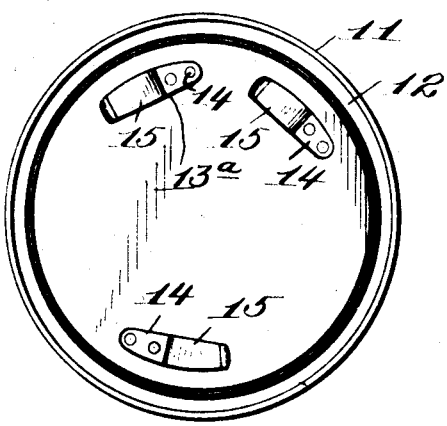
Figure 5:
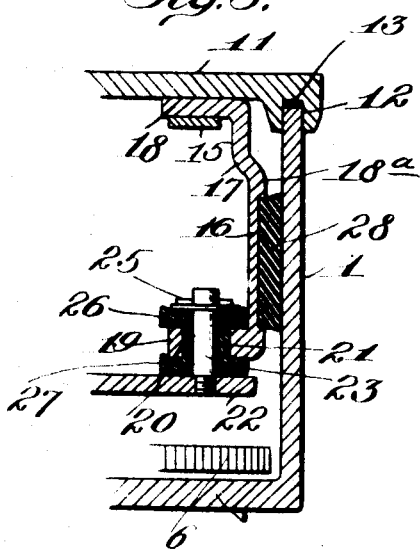
Figure 6:
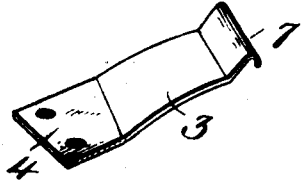

Describing the invention in detail, reference is had to the accompanying drawings, wherein like reference characters denote corresponding parts throughout the several views, and in which:

Figure 1 is a vertical sectional view of a speed recorder in accordance with this invention. Fig. 2 is a top plan with the recording mechanism removed, showing the interior arrangement of the casing or housing for such mechanism. Fig. 3 is a like view with the recording mechanism in position but with the cover of the casing or housing removed, showing the upper end of the hanger arms. Fig. 4 is an inverted plan of the cover for the casing or housing. Fig. 5 is a sectional detail showing one of the hanger arms connected with the cover of the casing or housing and to the base plate of the recording mechanism. Fig. 6 is a detail showing a yieldable cam for operating the punching mechanism.

Referring to the drawings by reference characters,
1 denotes a casing or housing which may be of any suitable shape but, as shown, is cylindrical in contour, and the said casing 1 is adapted to be clamped to the axle of the vehicle in a known manner. Projecting laterally from the inner face of the casing 1 is a plurality of pairs of positioning studs 1ª for the hanger arms to be hereinafter referred to.

In the casing 1 is adapted to be suspended a recording mechanism referred to generally by the reference character 2, preferably of a construction set forth in my copending application Serial No. 307,235, filed March 21,
1906. The recording mechanism embodies a dial punching mechanism which is actuated by a yielding cam member carried by an intermittently rotating ratchet wheel. In the construction of recording mechanism disclosed in the application referred to the punching mechanism thereof was actuated by a non-yielding cam member and it was found that, when suspending the recording mechanism in the casing 1, the height thereof would vary slightly, and, consequently, if the non-yielding cam member was not of exactly the proper height, it would cause the punching stroke to be too great, so as to injure the instrument, or it would not impart the necessary length of stroke, thus rendering the punching of the dial too light to be legible. To overcome this objection a yielding cam member is provided, and which will compensate for any slight inaccuracy of the recording mechanism when suspended, and thus render the operation of the purching mechanism always approximately the same. The yielding cam member consists of a strip of metallic material which is offset, as at 3, and has one end, as at 4, fixed to the intermittently operable ratchet wheel 5 which is mounted upon a vertical axis 6. The free end of the offset portion 3 is bent upwardly and downwardly in an angular manner, as at 7, and over which is adapted to ride the roller 8 carried on the lower end of the punch 9 of the punching mechanism. The roller 8 is positioned in the path of the angular bent end 7 of the offset portion 3, so that, during the rotation of the wheel 5, the end 7 of the cam member will engage the roller 8 and thereby impart a vertical movement to the punch so that the dial 2ᵇ will be punctured. The offset portion of the cam member projects upwardly at an inclination and above the plane of the roller 8. The said offset portion is yieldable and, by such arrangement, it is evident that compensation will be made for any slight inaccuracy in regard to the positioning or suspending of the recording mechanism within the casing 1. The actuating mechanism for the ratchet wheel 5 is arranged in the casing 1, is of a construction similar to that set forth in the application hereinbefore referred to, and is indicated generally by the reference character 10. The operating mechanism 10ᵃ for the actuating mechanism extends through a tubular projection 10ᵇ integral with one side of the casing 1, and the said actuating and operating mechanisms are of known construction, preferably as set forth in the application hereinbefore referred to. The operating mechanism is operated from the wheel of the vehicle in a known manner.

The cover of the casing 1 is indicated by the reference character 11, and which has the marginal portion of its lower face formed with an annular groove 12, so that the cover 11 can straddle the top edge of the casing 1, and within the groove 12 is mounted a resilient packing 13, which, when the cover 11 is clamped in position, will form a water-tight joint between the cover and casing, and, furthermore, materially assist in deadening shocks. The lower face of the cover 11 has secured thereto a plurality of coupling members 13ᵃ, as shown, three in number, there being as many coupling members as there are cushioned hanger elements 18ᵃ. The coupling members extend in different directions with respect to each other, and each of which consists of a strip of suitable material having a portion thereof, as at 14, secured to the inner face of the cover 11, and the remaining portions, as at 15, offset. The said offset portions are adapted to receive the upper ends of a plurality of cushioned hanger elements 18ᵃ for the purpose of coupling the recording mechanism 2 and suspending it from the inner face of the cover 11.

The cushioned hanger elements 18ᵃ, as shown, three in number, each consists of a hanger arm adapted to be positioned between a pair of studs 1ᵃ, and each of said arms comprises a vertically extending portion 16, an offset portion 17, a portion 18 extending at right-angles with respect to the portion 16 and forming the upper end of the arm, and a portion 19 which is apertured, as at 20, and extends at right-angles with respect to the portion 16 and forms the lower end of the arm. Mounted within the opening 20 of the portion 19 is a resilient washer 21, and extending up through said washer 21, as well as being secured at its lower end to the base plate 22 of the recording mechanism, is a connecting stud 23, whose function is to connect the lower end of the hanger arm to the base plate 22. Mounted upon the portion 19 of the hanger arm, surrounding the stud 23, and interposed between the fastening device 25 for the upper end of the stud 23, is a resilient washer 26, and interposed between the lower face of the portion 19 and the upper face of the base 22 and surrounding the stud 23 is a resilient washer 27. Secured in the outer face of the portion 16 of the hanger arm and projecting therefrom is a strip of resilient material 28. The resilient washers 21, 26, and 27 act as a means for deadening the shock from the vehicle and, furthermore, for cushioning the lower end of the hanger arm at the point of connection of the hanger arm with the base plate 22, while the elastic strip 28 acts as a means to deaden the shock between the casing and said arms and, furthermore, acts as a cushioning medium for the hanger arms. When the recording mechanism is suspended within the casing 1, the resilient strips 28 are compressed owing to their engagement with the inner face of the casing 1.

The cover 11 is clamped to the casing 1 through the medium of a stiff spring 29 adapted to seat intermediate its ends in a flange piece 30 carried upon the outer face of the cover 11 and has one end extending between and pivoted to a pair of apertured lugs 31 formed integral with one side of the casing 1. The other end of the spring 29 is pivoted to a link 32 which carries a lock 33, the casing of which is formed with a protuberance 34 which is adapted to take under an L-shaped lug 35 projecting laterally from the casing 1, and the latch 36 of the lock 33 is adapted to engage a keeper 37 which projects laterally from the casing 1.

When the recording mechanism is positioned within the casing 1, the strips 28 engage the inner face of said casing and, consequently, retain the recording mechanism in the position set. The cover is then mounted upon the casing and given a slight turn so that the coupling pieces will engage under the upper ends 18 of the hanger arms and, consequently, suspend the recording mechanism within the casing, as well as coupling the said mechanism to the cover. The cover 11 is then clamped to the casing 1.

What I claim is:—

1. A speed recorder comprising a casing, a cover therefor, a recording mechanism, a plurality of cushioned elements connected to said mechanism and each having an angular portion at one end, and means carried by the cover and detachably engaging the angular ends of said elements for suspending the mechanism within the casing.

2. A speed recorder comprising a casing, a recording mechanism, a plurality of hanger arms connected to said recording mechanism and each provided with a resilient strip adapted to engage the inner face of the casing and further provided with an offset portion terminating in an angular end, a cover for the casing, and means carried by the cover and engaging the angular end of said arms for suspending the recording mechanism within the casing.

3. In a speed recorder for vehicles, the combination of a recording mechanism, of means for preventing the transmission of vibrations caused by the vehicle to said mechanism, said means comprising a plurality of hanger arms resiliently connected at the lower end to said mechanism.

4. In a speed recorder for vehicles, the combination of a recording mechanism, of means for preventing the transmission of vibrations caused by the vehicle to said mechanism, said means comprising a plurality of hanger arms each resiliently connected at the lower end to said mechanism and having an angular upper end combined with a casing for said mechanism and to the cover of which the upper end of said arms are adapted to be detachably connected.

5. In a speed recorder for vehicles, the combination of a recording mechanism, of means for preventing the transmission of vibrations caused by the vehicle to said mechanism, said means comprising a plurality of hanger arms resiliently connected at the lower end to said mechanism and carrying resilient strips which project laterally from the outer side of the arms.

6. In a speed recorder for vehicles, the combination of a recording mechanism, means for preventing the transmission of vibrations caused by the vehicle to said mechanism, said means comprising a plurality of hanger arms resiliently connected at one end to said mechanism and carrying resilient strips which project laterally from one side of the arms, combined with a casing for said mechanism and with which the said strips engage and with which the said arms are adapted to detachably engage.

7. A speed recorder comprising a casing, a cover therefor, means for clamping the cover in position, a recording mechanism, studs connected thereto, resilient washers surrounding the studs, hanger arms having one end surrounding the washers, resilient washers mounted against the two faces of said end, laterally projecting resilient strips carried by said arms, coupling members carried by the cover and engaging the other end of said arms for suspending the recording mechanism within the casing, and holdfast devices engaging the studs.

8. A speed recorder comprising a casing, a cover therefor, a recording mechanism, studs connected thereto, resilient washers surrounding the studs, hanger arms having one end surrounding the washers, resilient washers mounted against the two faces of said end, laterally projecting resilient strips carried by said arms, coupling members carried by the cover and engaging the other end of said arms for suspending the recording mechanism within the casing, and holdfast devices engaging the studs.

In testimony whereof I have hereunto set my hand in presence of two subscribing witnesses.

CASCIOUS H. D'LA MONTE.

Witnesses:
E. A. HENKLE,
HARRY R. KEEN.